Oct. 27, 1925.

J. L. MORFOOT 1,558,491

BATTERY CONNECTER

Filed Oct. 14, 1922     2 Sheets-Sheet 1

Inventor
James L. Morfoot
By F. E. Shannon
Attorney

Oct. 27, 1925.

J. L. MORFOOT

BATTERY CONNECTER

Filed Oct. 14, 1922

Inventor
James L. Morfoot
By F. E. Sha——
Attorney

Patented Oct. 27, 1925.

1,558,491

UNITED STATES PATENT OFFICE.

JAMES L. MORFOOT, OF AKRON, OHIO.

BATTERY CONNECTER.

Application filed October 14, 1922. Serial No. 594,587.

*To all whom it may concern:*

Be it known that I, JAMES L. MORFOOT, a citizen of the United States, residing at Akron, in the county of Summit and State of Ohio, have invented new and useful Improvements in Battery Connecters, of which the following is a specification.

This invention relates to new and useful improvements in terminal connecters for electric storage batteries and similar devices and has particular relation to a combined terminal connecter and lock adapted to be used in connecting the wiring system of an automobile to a storage battery.

The invention contemplates a connecter for the batteries of automobiles which may be manually operated by any person possessing the proper key, to make or break the electrical circuit.

The main objects of this invention are to provide a connecter of simple, inexpensive construction, whereby a conductor wire may be quickly and easily secured to the terminal posts of a storage battery and which will provide efficient means whereby a good electrical contact may be maintained.

A particular object is to provide a combined connecter and lock which may be securely fastened to a terminal post of a storage battery in a manner which will prevent its being removed by persons not possessing the proper key and which when locked with the circuit open will prevent any other connection being made with the terminal post.

A still further object is to provide a connecter of the character above indicated which may be used on an automobile to connect the electrical system thereof to a storage battery and to provide in combination therewith key controlled locking means whereby the circuit may be broken and to thereby provide new and novel means whereby the electrical connection of a storage battery may be disconnected when the automobile is not in use.

The above and additional objects are accomplished by the novel construction, combination and arrangement of parts hereinafter described and illustrated in the accompanying drawings, wherein I have shown a preferred embodiment of the invention, it being understood that the invention is capable of various adaptations and that changes and modifications may be made or substitutions resorted to which come within the scope of the claims hereunto appended.

In the drawings in which like characters are employed to designate similar or like parts as the same may occur in any of the several views and in which:—

Figure 1:
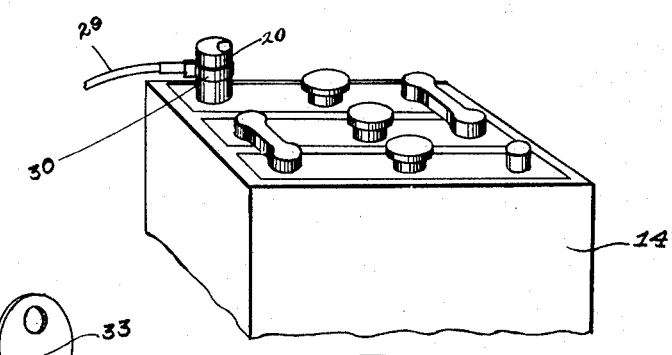
Figure 1 is a fragmentary view showing in perspective the upper portion of a storage battery equipped with my improved device.

Briefly stated, my improved device includes a casing adapted to be positioned over the terminal post of a battery. The casing is insulated from said post and secured in place by key controlled means in a manner that will prevent its removal by any one not possessing the proper key. An electrical wiring system is connected to said casing and to the other terminal of the battery and the same key controlled means is adapted to be operated to make or break the electrical circuit.

In the drawings the numeral 10 denotes a base or insulating member which is composed of wood, fiber, bakelite, hard rubber or any suitable insulating material. The said casing is substantially cylindrical in form and is provided at the lower end thereof with a downwardly projecting circumferentially extending flange 11. The base 10 is provided with the socket 12 which projects therein from the lower side thereof and is adapted to snugly receive the terminal post 13 of the storage battery 14. The terminal post 13 is provided with a coaxially arranged threaded bore 15 which projects into the post from the upper end thereof. The insulating member 10 is also provided with a centrally positioned threaded bore 16 which is of the same size as the bore 15 and projects into the upper end of the insulating member 10 so as to communicate with the socket 12 in coaxial alinement with the bore 15 in the post 13.

The insulating member 10 is also provided with threaded bores 17 which project radially therein and are adapted to receive the set screws 18 which are threaded therein for the purpose of securing the insulating member 10 to the post 13. Each bore 17 is enlarged at the outer end thereof to provide a cavity 19 so that the said screw 18 when operatively secured in said insulating member will be positioned inwardly from the outer circumferential surface of the said insulator 17, and will be out of contact with the casing hereinafter described.

Figure 4:
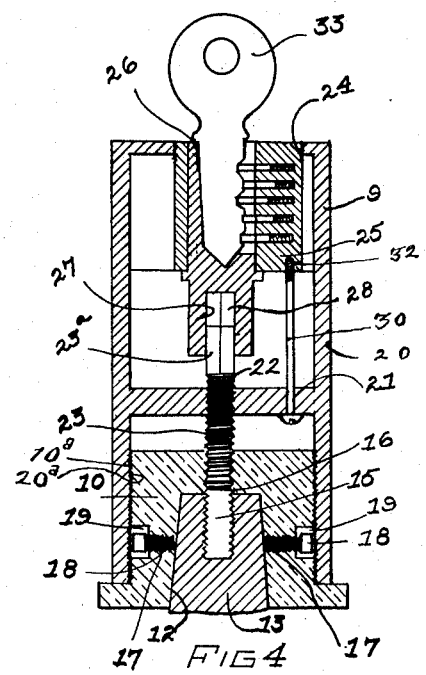
Figure 4 is a central, vertical, sectional view of my improved device showing the same operatively connected to the terminal post of a storage battery, the same being taken as indicated by the line 2—2 of Figure 2.

The numeral 20 denotes a cylindrical casing which is composed of electrical conductive material and is open at the lower end thereof to snugly receive the insulating member 10, over which it is fitted with the lower edge of the casing resting on the flange 11 as shown in Figure 4. The insulator 10 is externally threaded with the left hand screw threads 10ª and the casing 20 is likewise interiorly threaded adjacent the lower end thereof with the left hand screw threads 20ª so that the casing may be operatively secured thereon. The bore 22 in the partition 21 and the bore 16 in the member 10 are provided with right hand screw threads.

The numeral 21 denotes a partition which is preferably formed integrally with the casing 20 and divides the casing into upper and lower compartments. The partition 21 is provided with the threaded bore 22 which is formed therein so as to be in coaxial alinement with the threaded bores 16 in the insulating member 10 and the threaded bore 15 in the terminal post 13.

The numeral 23 denotes a threaded bolt which is operatively positioned in the bore 22 in the post 21 and in the bore 16 in the insulating member 10. The bolt 23 is provided at the upper end thereof with a squared end 23ª and is arranged so that it may be secured down into the bore 15 in the post 13, thus establishing an electric connection between the casing 20 and the said post. The casing 20 is provided in the upper wall thereof with a circular opening 24 in which is fitted a cylindrical lock 25 which may be of ordinary or improved construction. The rotary element 26 of the lock 25 is arranged in coaxial alinement with the bolt 22 and the said rotary element is provided with a downwardly projecting portion 27 which has a socket 28 adapted to receive the squared end of the bolt 22. The socket 28 is of sufficient depth to permit a longitudinal movement of the squared end 23ª therein so that the bolt 23 may be rotated by said rotary element 26 to drive the bolt to or from the bore 15 of the post 13.

Figure 2:
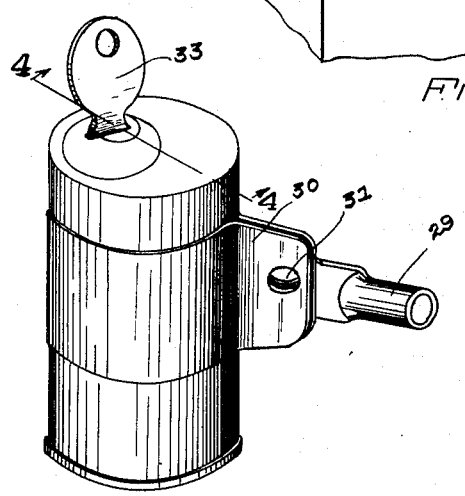
Figure 2 is a perspective view of my improved connecter, showing one manner of connecting a conductor wire thereto.
Figure 3:
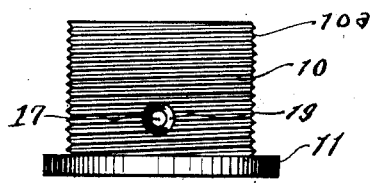
Figure 3 is a perspective view of the insulator employed in carrying out this invention.

While I have shown the cylinder 25 as being soldered, brazed or similarly secured in the opening 24, it is to be understood that the same may be secured in said cylinder in any desired manner. The numeral 30 denotes a strap which is secured to the conductor 29 and is secured around the casing 20 by means of the screw bolt 30 as shown in Figure 2.

Figure 5:
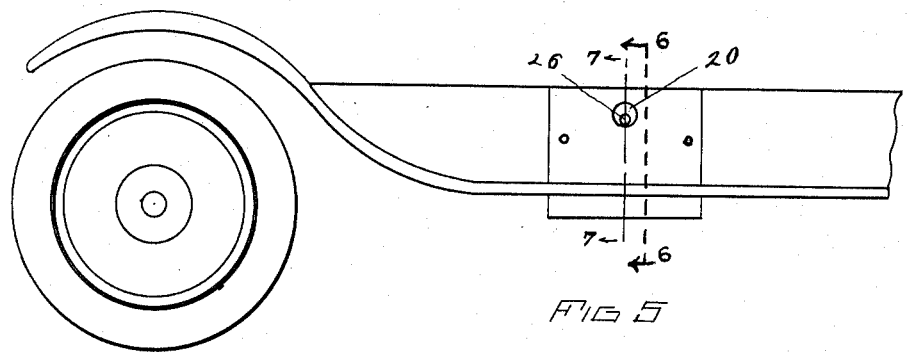
Figure 5 is a side elevational view showing the running board of an automobile and illustrating one manner of installing my improved device.
Figure 6:
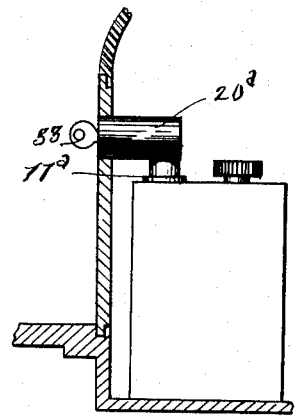
Figure 6 is a vertical, sectional view of same illustrating one form of battery box with the battery therein and showing one modification of my improved device operatively connected thereto, the same being taken as indicated by the lines 6—6 of Figure 5.
Figure 7:
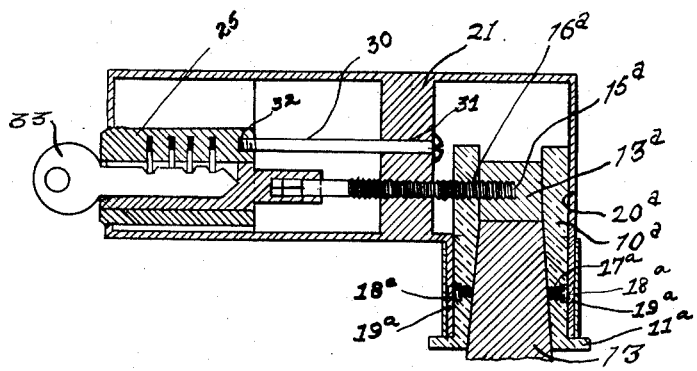
Figure 7 is a central, vertical, sectional view showing a modification of my improved device, taken as indicated by the lines 7—7 of Figure 5.

In Figures 5, 6 and 7 I have illustrated a modification of my improved device which is adapted to be used in connection with batteries positioned in the running board of an automobile. This modification of the invention differs from the construction above described as the casing is adapted to lie in a horizontal position and is provided at the lower end thereof with an angular extension 20ª which is adapted to fit over the insulator member 10ª.

In the modification shown the numeral 13ª denotes an extension which is soldered or otherwise secured to the top of the post 13. The extension 13ª is provided with the threaded bore 15ª and the insulating member 10ª is provided with the threaded bore 16ª; both of said bores being in coaxial alinement and being adapted to receive the threaded end of the bolt 23 which may be operated to make or break an electrical contact between the partition 21 and the post extension 15ª. The insulating member 20ª is provided with suitable threaded bores 17ª and is secured to the post 15 by means of the set screws 18ª; the bores being employed at the outer ends thereof to form the cavities 19ª which serve exactly the same purpose as the cavities 19 above described.

In the modification of the invention shown in Figure 7 I have shown the cylinder 25 threaded in the opening 24 and have provided the screw bolt 30 which is positioned through a bore in the partition 21 and is threaded in a bore 32 in the cylinder 25 to retain the cylinder in the casing 20 and prevent its being removed by a person not possessing the key. This method of securing the cylinder 25 in the casing 20 may be employed if desired in the construction shown in Figure 4 above described.

To secure my improved device to a storage battery, the insulating member 10 is first placed over the post 13; the set screws 18 are then operated in the threaded bore 17 to secure the insulating member on the post. The casing 20 is then placed over the insulator 10 and is operatively threaded thereon. The key 33 is then inserted in the lock 25 and the element 26 is rotated to move the squared end 23ª of the screw 23 to an upward position in the socket 28. The casing is then placed over the insulator member 10 with the screw bolt 23 registered with the threaded bore 16 and the key 33 is operated to enter the same in said bore 16. If an electrical contact is desired the key 33 is operated in the same direction until the bolt 23 is entered into the bore 15 in the terminal 13. To break the electrical contact thus formed the key is reversely operated to withdraw the same from the bore 16 and the key 33 is removed with the bolt 23 operatively secured in the insulator member 10.

As the screw bolt 23 is secured in the partition 21 and in the insulating member 10, it will be seen that the casing can not be moved by any one not possessing the proper key. It will also be seen that when the device is operated to the position shown in Figure 4 that no other means can be employed to connect a conductor wire to the part 13 and that a battery equipped with my improved device can be effectually locked against unauthorized use. The casing 20 cannot be removed from the insulator 10 by a rotary movement thereof, as it is provided with a left hand screw thread while the rod 22 is provided with a right hand screw thread.

Having thus illustrated my invention and described the same in detail, what I claim as new and desire to secure by Letters Patent is:—

1. In a device of the class described, in combination with a battery an insulating member having a socket adapted to receive the terminal post of a battery, means to secure said insulating member to said post, a casing adapted to fit over said insulating member and lock controlled means to secure said casing to said insulating member, said means being operable to establish an electrical contact between said post and said casing.

2. In a device of the class described, in combination with a battery, an insulating member having a socket adapted to receive and entirely cover the terminal post thereof, means to secure said insulating member to said post, a casing of elastic conductive material adapted to fit over said insulating member and key controlled means to secure said casing to said insulating member, said means being operable to establish an electrical contact between said post and said casing.

3. In a device of the class described, in combination with a battery, a terminal post therefor, a socketed insulating member adapted to entirely cover said terminal post, means to secure said insulating member to said post, a casing of elastic conductive material adapted to fit over said insulating member and enclose said securing means and key controlled means to secure said casing to said insulating member, said means being operable to make or break an electrical contact between said post and said casing.

4. A connecter for a storage battery comprising a hollow casing adapted to cover the terminal post thereof, an insulator between said casing and said post, means to secure the insulator to the post, and key controlled means to secure said casing to said insulator, said key controlled means being operable to establish an electrical connection between the post and casing.

5. In combination, a storage battery, a terminal post therefor, a threaded bore in said post, a cylindrical insulator having a socket adapted to receive said terminal post, means to secure said post in said socket, a threaded bore formed in said insulator, a casing of electrical conductive material fitted over said insulator and covering said securing means, a partition in said casing, a threaded bore formed in said partition, all of said threaded bores being coaxially alined; a threaded bolt operatively mounted in said bores, said bolt provided at the outer end thereof with a squared end, a key controlled lock in the outer end of said casing, said lock provided with a rotatable socket adapted to receive said squared end and permit a sliding movement thereof, said lock being operable to rotate said bolt to make or break an electrical connection between said terminal post and said casing and means to connect a conductor wire to said casing.

6. In combination, a storage battery, a terminal post therefor, a threaded bore in said post, a cylindrical insulator having a socket adapted to receive said terminal post, said insulator provided at the lower end thereof with a circumferentially extending outwardly projecting flange, means located above said flange to secure said post in said socket, a threaded bore formed in said insulator, a casing of electrical conductive material fitted over said insulator and adapted to cover said securing means and rest on said flange, a partition in said casing a threaded bore formed in said partition, all of said threaded bores being coaxially alined, a threaded bolt operatively mounted in said bores, a key controlled lock in the outer end of said casing, said lock being operable to rotate said bolt to make or break an electrical connection between said terminal post and said casing and means to connect a conductor wire to said casing.

7. In combination, a storage battery, a terminal post therefor, an insulator having a socket adapted to receive said terminal post, means to secure said post in said socket, a threaded bore formed in said insulator, a casing of electrical conductive material fitted over said insulator and covering said securing means, a partition in said casing a threaded bore formed in said partition, said threaded bores being coaxially alined, a threaded bolt operatively mounted in said bores so that it may be operated to contact with said post, a key controlled lock in the outer end of said casing, said lock operatively connected to said bolt and being operable to rotate the same to make or break an electrical connection between said terminal post and said casing.

8. In combination, a storage battery, a terminal post therefor, a threaded bore in said post, a cylindrical insulator having a socket adapted to receive said terminal post, means to secure said post in said socket, a threaded bore formed in said insulator, a casing of electrical conductive material fitted over said insulator and covering said securing means, a conductor wire and means to secure said wire to said casing, said threaded bores being coaxially alined, a threaded bolt secured to said casing and operatively mounted in said bores, a key controlled lock in the outer end of said casing, means operatively connecting said lock to said bolt, said lock being operable to rotate said bolt to make or break an electrical connection between said terminal post and said casing.

In testimony whereof I have hereunto set my hand.

JAMES L. MORFOOT.